US006881934B2

United States Patent
Behling et al.

(10) Patent No.: US 6,881,934 B2
(45) Date of Patent: Apr. 19, 2005

(54) PRODUCTION OF A CYLINDRICAL HOUSING FOR A DOUBLE SCREW EXTRUDER

(75) Inventors: Michael Behling, Hameln (DE); Volker Wesling, Clausthal-Zellerfeld (DE); Uwe Motzkau, Lehrte (DE)

(73) Assignee: Berstoff GmbH, Hannover (DE)

( * ) Notice: Subject to any disclaimer, the term of this patent is extended or adjusted under 35 U.S.C. 154(b) by 0 days.

(21) Appl. No.: 10/471,156

(22) PCT Filed: Mar. 7, 2002

(86) PCT No.: PCT/DE02/00876

§ 371 (c)(1),
(2), (4) Date: Sep. 8, 2003

(87) PCT Pub. No.: WO02/070754

PCT Pub. Date: Sep. 12, 2002

(65) Prior Publication Data

US 2004/0074092 A1 Apr. 22, 2004

(30) Foreign Application Priority Data

Mar. 8, 2001 (DE) .......................... 101 12 295

(51) Int. Cl.$^7$ ................................. H05B 6/38
(52) U.S. Cl. ..................... 219/635; 219/644; 148/150; 464/124
(58) Field of Search ................. 219/644, 639, 219/635, 652, 601, 632, 676, 658; 148/570, 571, 641, 625, 212, 318, 150; 464/124, 109, 118; 366/97

(56) References Cited

U.S. PATENT DOCUMENTS

| 4,375,997 A | * | 3/1983 | Matz ............................ 148/570 |
| 4,401,485 A | * | 8/1983 | Novorsky ..................... 148/571 |
| 4,689,035 A | * | 8/1987 | Orain ........................... 464/124 |
| 5,304,000 A | * | 4/1994 | Kowalczyk et al. ........... 366/97 |

\* cited by examiner

*Primary Examiner*—Quang T. Van
(74) *Attorney, Agent, or Firm*—Cohen, Pontani, Lieberman & Pavane

(57) ABSTRACT

A process for producing a barrel for a twin-screw extruder with intermeshing screws from a steel block, wherein the barrel has a wear resistant inner surface, includes producing two partially intersecting bores passing completely through the steel block, the two intersecting bores forming a spectacle-shaped bore having narrowed regions where the two intersecting bores intersect, and hardening an inner surface of the spectacle-shaped bore with essentially constant depth of penetration by passing an inductor through the spectacle-shaped bore from one end to the other, the inductor is smaller than but having approximately the same shape as the inner contour of the spectacle-shaped bore and is configured such that less energy for heating the inner surface of the spectacle-shaped bore is delivered in the vicinity of the two narrowed regions of the spectacle-shaped bore by the longitudinal sections on the periphery of the inductor than in regions on the inner contour remote from the narrowed regions.

14 Claims, 3 Drawing Sheets

PRODUCTION OF A CYLINDRICAL HOUSING FOR A DOUBLE SCREW EXTRUDER

PRIORITY CLAIM

This is a U.S. national stage of application No. PCT/DE02/00876, filed on Mar. 07, 2002. Priority is claimed on that application and on the following application(s): Country: Germany, Application No.: 101 12 295.0, Filed: Mar. 08, 2001.

BACKGROUND OF THE INVENTION

1. Field of the Invention

The invention relates to a process for producing a barrel with a wear-resistant inner surface from a steel block for a twin-screw extruder with intermeshing screws, the process including the steps of producing two partially intersecting bores (i.e., forming a bore with a spectacle-shaped cross section) that pass all the way through the steel block, followed by hardening of the inner surface of the spectacle-shaped bore. The invention also relates to equipment for hardening the inner surface of the spectacle-shaped bore.

2. Description of the Prior Art

Twin-screw extruders with tightly intermeshing screws have barrels made of partial axial segments with a spectacle-shaped bore that passes completely through the barrel. The two extruder screws rotate in the spectacle-shaped bore a short distance away from its inner surface. The inner surface of the barrel bore is subject to abrasive wear, which has basically two causes. The first cause is the processing of feedstocks with aggressive properties, e.g., plastics that contain abrasive fillers. The second cause is related to the pressure conditions that arise inside the barrel during processing, which can lead to radial deflections of the screw shaft and thus to sliding contact between the outer surface of the screw and the inner surface of the barrel. For this reason, to the extent possible, barrels which are produced from a steel block are used in which the two partially intersecting bores for the two screws are produced, and the inner surface of the bores is subsequently hardened. This is usually accomplished by placing the machined workpiece in a hardening furnace, bringing it to hardening temperature, and then quenching it. This produces through-hardening of the workpiece, which is usually undesirable. For one thing, this applies to the flanges of the segments of the barrel, by which the segments are joined together to form a continuous barrel. For another, it applies to the two narrowed regions of the spectacle-shaped bore of the barrel, i.e., to the regions of the barrel near the intersecting zone of the two bores that pass through the barrel. Specifically, at these points it is desirable for the barrel to have the best possible toughness properties to avoid fractures, but toughness properties are generally lost as a result of through-hardening. In addition, the costs of this type of hardening treatment are relatively high, because the hardening treatment depends primarily on the weight of the workpieces, and a barrel segment for a twin-screw extruder is very heavy due to the thick walls that are required.

It is well known that the hardening of workpieces can be limited to the surface region of the given workpiece by case hardening, so that most of the material constituting the workpiece retains essentially its original good toughness properties. To do this, the workpiece, which is made of low-carbon steel, is placed in a furnace in which a carbon-rich atmosphere is maintained, so that the diffusion of carbon into the steel occurs to such an extent that subsequent cooling then produces the desired hardening effect. Nitriding of the surface region can be carried out in similar fashion by systematic diffusion of nitrogen into the steel. However, these types of processes are especially expensive due to the long annealing times that are required.

However, it is also basically well known that surface hardening can be carried out by heating an intrinsically hardenable steel only at the surface, i.e., to a limited depth of penetration, and then quenching it. The heating can be produced by flames or by inductive heating. In the latter case, electric eddy currents are induced by an inductor in the workpiece to be treated, which cause heating, especially due to the magnetic reversal of the workpiece.

Basically, inductive heating in constant form, i.e., with constant depth of penetration, can be carried out without any great problems in workpieces of uniform contour. For example, inductive heating is practiced especially successfully in the heating of steel pipes of circular cross section. Of course, in the case of barrels for twin-screw extruders, inductive heating by means of an inductor with a shape corresponding to the shape of the barrel cross section would lead to extremely nonuniform heating and depths of penetration. Specifically, the narrowed regions would be subjected to especially high thermal energy, since the energy input at those places would occur, as it were, from both barrel bores. Accordingly, the practical result upon cooling under hardening conditions would be through-hardening in the narrowed region. The result of this would be that these regions would become especially susceptible to fracture. Because of this excessive hardening, inductive hardening has never been used before.

SUMMARY OF THE INVENTION

The object of the present invention is to refine a process of this general type in such a way that the time and expense required to produce hardening of the inner surface of a barrel for a twin-screw extruder are as small as possible, such that the depth of the hardening should be limited and as uniform as possible over the periphery of the spectacle-shaped bore. In addition, equipment for carrying out a hardening treatment of this type is to be specified.

In accordance with the invention, after the spectacle-shaped bore has been produced in the steel block used for the production of the barrel or barrel segment, the inner surface of the spectacle-shaped bore is hardened by inductive hardening. The depth of penetration is essentially maintained at a constant value by using an electrical inductor that is smaller than, but has approximately the same shape as, the inner contour of the spectacle-shaped bore and is passed through the spectacle-shaped bore from one end of the bore to the other. In accordance with the invention, this inductor is configured in such a way that significantly less energy for heating the inner surface of the spectacle-shaped bore is delivered in the vicinity of the two narrowed regions of the spectacle-shaped bore with respect to the associated longitudinal section on the periphery of the inductor than in the regions of the inner contour more remote from the narrowed regions. Consequently, the individual volume elements near the narrowed regions, which are close to both of the barrel bores and therefore receive heat input via the inner surface of both bores, are heated less intensely than if there were equal thermal energy input (specific thermal energy input) everywhere with respect to the inner surface of the barrel bores. The specific thermal energy input can be metered in such a way that the heating that occurs in each narrowed region, at least approximately in the material zone that is close to the inner surface and that is intended for hardening, is approximately equally intense as the heating that occurs in the surface regions more distant from the two narrowed regions. In this way, the undesired through-hardening of large parts of the narrowed region can be avoided. Thus, the desired ductility in the volume parts of the barrel wall farther from the bore surfaces is also maintained to the specific extent required in the narrowed region.

Depending on the type of steel material used for the barrel, a minimum cooling rate is necessary after heating to the hardening temperature to carry out the inductive hardening. In so-called air hardening, normal cooling in air at rest is completely adequate, especially since heat is able to flow from the regions near the surface into the volume elements of the wall of the barrel that were not inductively heated. In the case of materials that require more abrupt cooling, a cooling device for accelerating the cooling of the inductively heated regions is advantageously passed through the spectacle-shaped bore a short axial distance behind the inductor. In this way, the inner surface is first heated over a short portion of its axial length and then quenched immediately thereafter. The hardening is thus carried out in a spatially continuously progressing process. Depending on the desired magnitude of the cooling rate, liquid coolants (e.g., water) or gaseous coolants (e.g., air) can be used for the accelerated cooling.

The specific thermal energy input in the vicinity of the two narrowed regions of the spectacle-shaped bore can be reduced in a variety of ways. In one embodiment, the invention provides that the inductor be guided through the barrel bores at a significantly greater distance from the inner surface in the vicinity of the two narrowed regions, compared to the remaining region of the inner contour of the spectacle-shaped bore. The greater the distance of the inductor from the inside surface of the barrel, the less thermal energy can be produced by the inductor in the given surface region.

Another possibility consists in varying the electrical operating parameters of the inductor from region to region with respect to the periphery of the inner surface. Especially the process parameters of current intensity and frequency of the inductor current should be mentioned in this connection. As is already well known, the depth of penetration can be varied by the choice of frequency, while the intensity of the inductor current is critical for the amount of thermal power that can be introduced. Therefore, the thermal input can also be affected by the choice of the length of time the inductor is turned on during its passage through the spectacle-shaped bore. Preferably, an inductor is used which has segments over the length of its periphery that can be electrically controlled independently of one another. Thus, provision can be made to control the inductor segment or segments situated in the immediate vicinity of the narrowed regions, for example, by cyclic timing, so that they are not continuously operating during the entire treatment time. However, they may also be operated at constant electric power, but at a reduced level as compared to the regions more distant from the narrowed regions.

Naturally, in addition to influencing the operating parameters, it is also possible to use a mode of operation in which the distance of the inductor from the inner surface of the spectacle-shaped bore is systematically adjusted to unequal values along the periphery of the inductor.

The process of the invention can be used with special advantage in barrels which are made of a relatively inexpensive metallic material and whose inner surface has been plated with a high-grade hardenable material, so that a composite material is in fact being used. In this regard, if a nonmagnetic material is used for the plating, the heating can also be carried out indirectly through the base material. This kind of plating is applied before the machining of the spectacle-shaped bore has been completed. Thus, the surface of the plating is also machined before the hardening is carried out.

Equipment in accordance with the invention for the inductive hardening of the inner surface of a spectacle-shaped bore in a steel barrel for a screw extruder, which is used especially for carrying out the hardening operation in accordance with a production process of the invention, has an electrical inductor, whose outer shape corresponds approximately to a reduced version of the inner contour of the spectacle-shaped bore, such that the inductor is configured in such a way that significantly less energy is delivered for heating the inner surface in the vicinity of the two narrowed regions of the spectacle-shaped bore with respect to the associated longitudinal section on the periphery of the inductor, than in the regions of the inner surface more remote from the narrowed regions.

Preferably, an inductor is formed as a continuous electrical conductor, which has the approximate outer shape of a "figure 8," by bending an electrically conductive tube, preferably a copper tube. A coolant can be passed through this tube to cool the inductor. The inductor is shaped in such a way that the upper and lower regions of the "figure 8" are each bent into a circular shape, while a region with a decreasing radius of curvature follows these upper and lower circular regions as the curve approaches closer and closer to the middle region of the "figure 8", which corresponds to the narrowed region of the spectacle-shaped bore. In the actual middle region of the "figure 8", an oppositely curved section is provided on each side to join the regions with the smaller radius of curvature with each other in pairs. The variation of the radius of curvature has the effect that the given subregions on the periphery of the inductor have different distances from the inner surface as the inductor passes through the spectacle-shaped bore of the barrel.

Alternatively or additionally, the inductor can be divided into several segments that can be electrically controlled independently of one another. Thus, in this case, the inductor is not formed as a continuous electrical conductor, but rather is constructed of segments, which are electrically insulated from one another, but which, in their combination, may again have an outer shape that approximates a "figure 8". However, it is also possible for the inductor to be practically constructed from two separate parts, which correspond in their outer shape to the two parts of the spectacle-shaped bore, i.e., to the two intersecting barrel bores. Here again, provision is made for the regions of the inductor near the narrowed regions to have a greater distance from the inner surface than the regions that are farther from the narrowed regions. Alternatively or additionally, one may also choose to subdivide the two parts of the inductor into segments that are electrically controllable independently of one another.

A cooling device is preferably located a short axial distance behind the inductor, by which the surface regions of the spectacle-shaped bore that are heated by the inductor as it passes through the spectacle-shaped bore can be cooled at an accelerated rate. This cooling device is preferably formed from a circulating distributor pipe bent into a shape similar to a "figure 8", whose contour is adapted in its size to the given spectacle-shaped bore to be treated. This distributor pipe has a large number of nozzles for a fluid coolant, especially a coolant gas. The nozzles are directed radially outward and obliquely opposite the intended direction of movement of the equipment.

BRIEF DESCRIPTION OF THE DRAWINGS

The invention is explained in greater detail below with reference to the embodiments shown schematically in the drawings.

DETAILED DESCRIPTION OF THE PRESENTLY PREFERRED EMBODIMENTS

Figure 6:
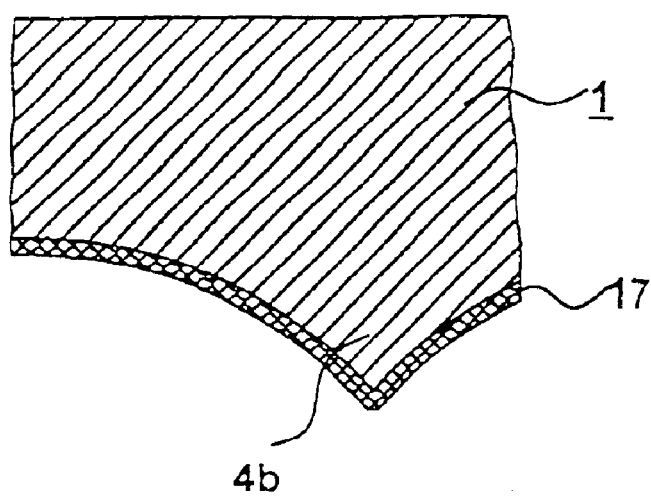
FIG. 6 shows an enlarged section of the wall of the barrel in the region of the narrowing.

Each of FIGS. 1 to 4 shows a cross section of a barrel 1 with a spectacle-shaped bore 2 formed from two intersecting barrel bores. The barrel 1 was produced from a block of hardenable steel by machining production methods. In the intersecting region of the two barrel bores, the barrel wall is shaped in the form of the two narrowed regions 4a, 4b. A narrowing of this type is shown as an enlarged section in FIG. 6. The inner surface of the barrel 1 is to be hardened in such a way that the hardened layer 17 has only a very limited depth of, for example, 0.5–2 mm. This is intended to prevent the narrowed regions 4a, 4b from becoming through-hardened and thus losing their ductility in their interiors. A plating 18 of high grade hardenable material may be applied to an inner surface of the barrel before machining of the spectacle-shaped bore is complete. When present, the plating comprises at least a part of the hardened layer 17.

Figure 1:
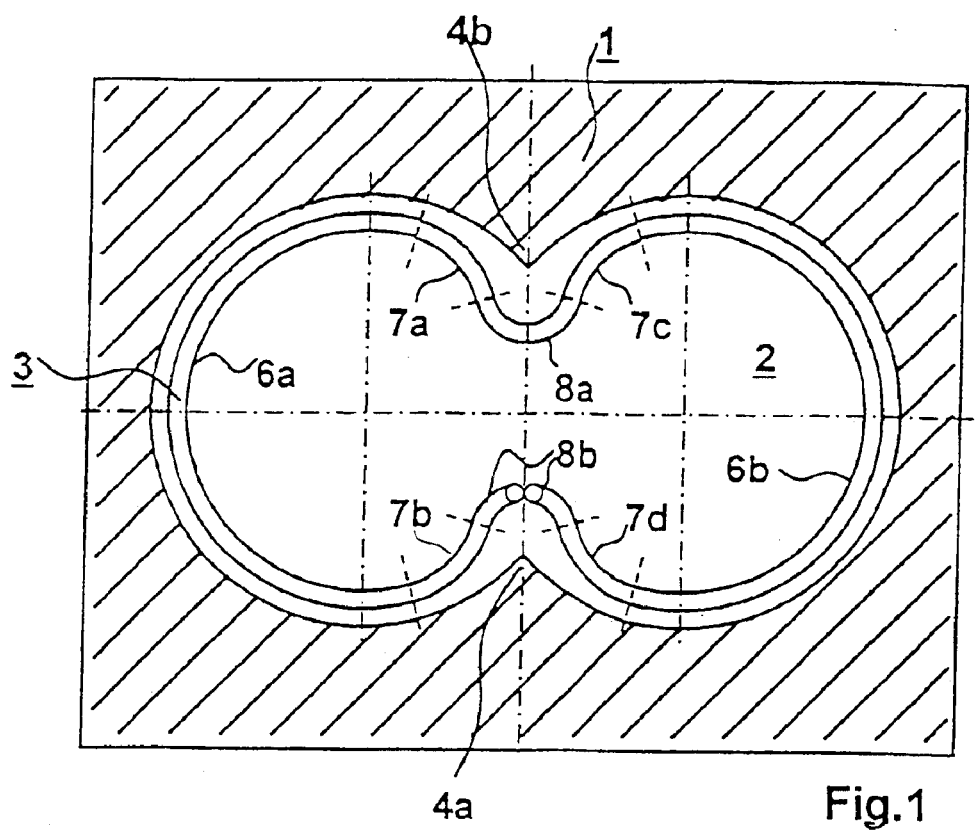
FIGS. 1 to 4 are cross-sectional views, each showing a different embodiment of an inductor according to the invention in a barrel.

The interior of the spectacle-shaped bore 2 in FIG. 1 contains an electrical inductor 3, which is essentially bent in the form of a "figure 8" lying on its side as a continuous electrical conductor, which is made, for example, from a copper tube. The inductor 3 consists of several parts with different curvatures. Each of the two parts 6a and 6b has a constant radius of curvature, which ensures that the distance of these parts from the inner surface of the spectacle-shaped bore 2 is constant in each case. These parts 6a and 6b are directly followed by the parts 7a to 7d, which have a decreasing radius of curvature as they approach the middle region of the "figure 8," so that in these regions, the distance of the inductor from the inner surface of the spectacle-shaped bore is correspondingly increased. The two oppositely curved sections, 8a and 8b, are provided to join the parts 7a, 7c and 7b, 7d, respectively, with each other. In this regard, the oppositely curved part 8b is in principle designed as a separate part, since the two electrical connections for supplying the inductor current are located on it. These connections are indicated by the two small circles.

Figure 2:
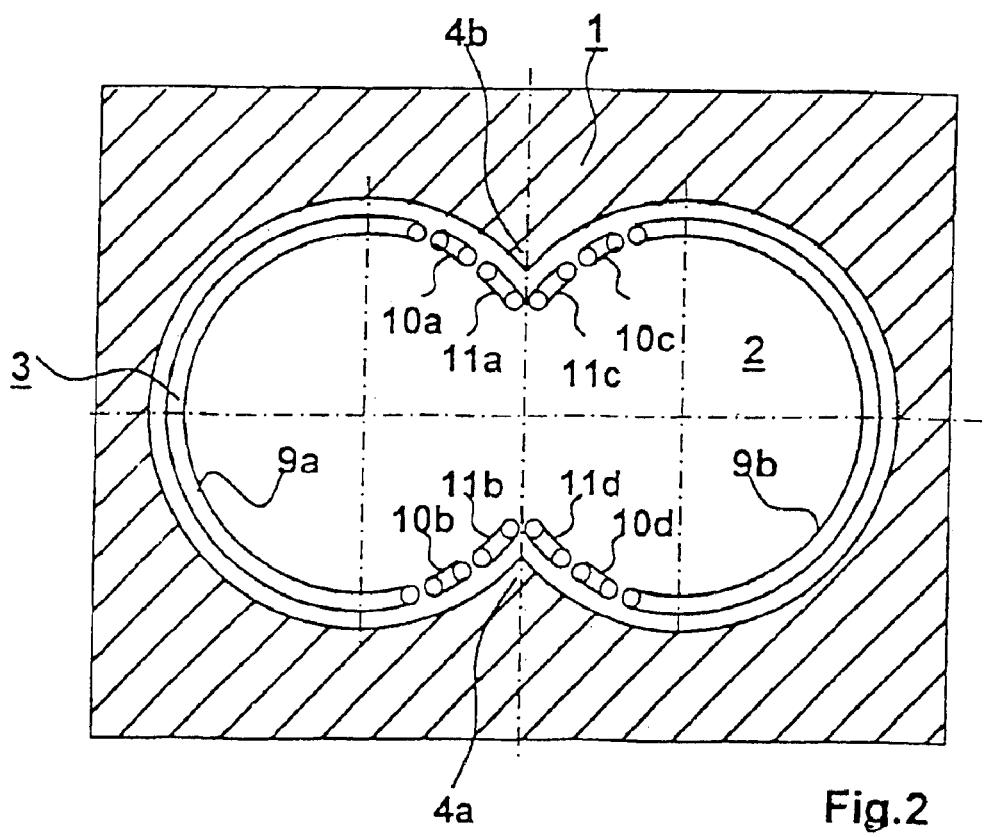

FIG. 2 shows another embodiment of the inductor 3, in which individual parts can be electrically controlled independently of one another in the vicinity of the two narrowed regions 4a, 4b and thus have separate connections for the inductor current. All together, in this inductor 3, the distance to the inner surface of the spectacle-shaped bore 2 remains practically constant over the whole periphery. In the present case, the inductor 3 consists of two circularly curved parts 9a, 9b, whose circumferences are larger than semicircles. Each end of the two parts 9a, 9b is followed one after the other by two smaller parts 10a, 11a, and 10b, 11b, and 10c, 11c, and 10d, 11d of the inductor. Since they are arranged symmetrically with respect to the inner contour of the spectacle-shaped bore 2, the parts 10a to 10d can be operated with the same electrical parameters, i.e., they can be connected to the same current source. The same is true of the parts 11a to 11d. Compared to the parts 9a, 9b, these parts can be operated especially with reduced inductor current and/or with cyclic timing to reduce the specific thermal energy input in the narrowed regions 4a, 4b.

Figure 3:
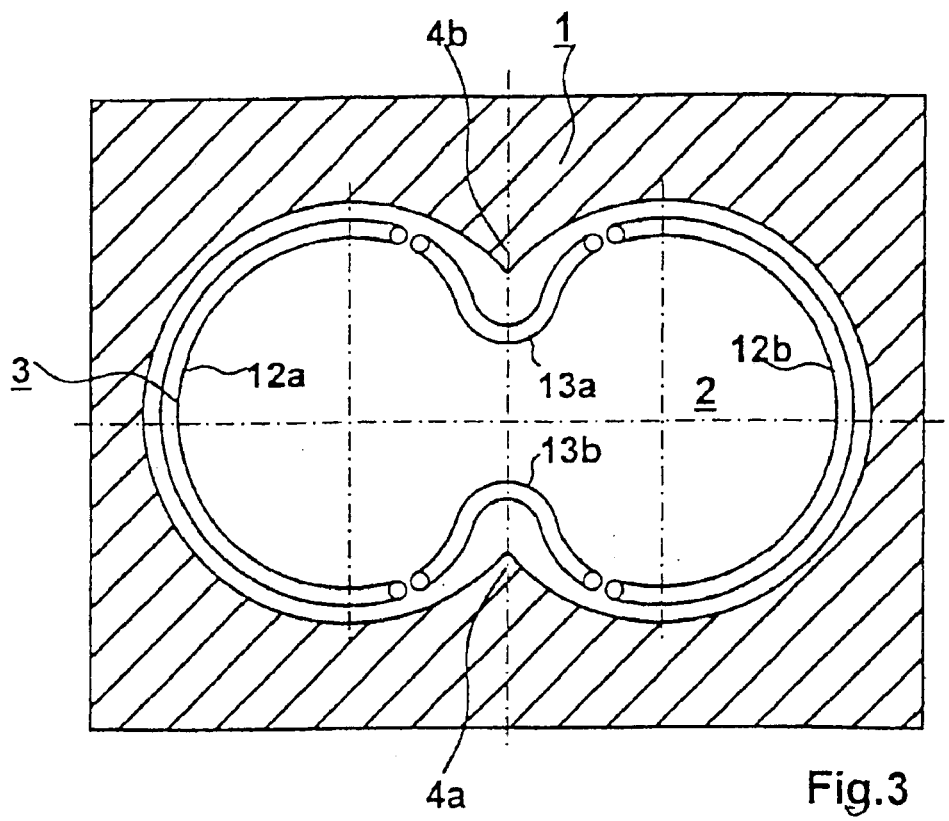

FIG. 3 shows a variant of the inductor 3, in which, all together, four segments, 12a, 12b, 13a, 13b, are provided, which can be electrically controlled independently of one another. The two segments 12a, 12b have a constant radius of curvature, while the inductor parts 13a, 13b, which are located in the vicinity of the two narrowed regions 4a, 4b, are curved in such a way that their distance from the inner surface increases as they approach the tips of the corresponding narrowed regions 4a and 4b. In addition, it is provided that the two parts 13a, 13b are operated with reduced electric power compared to the two parts 12a, 12b.

Figure 4:
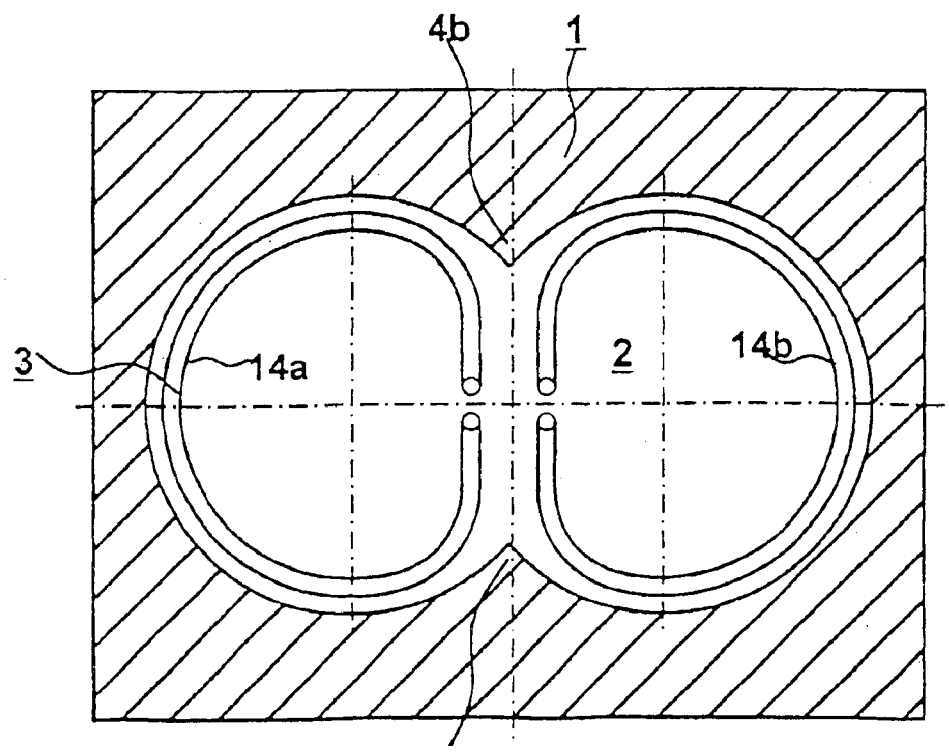

FIG. 4 shows a variant of the inductor 3, in which the inductor consists of two parts 14a, 14b, both of which are operated with the same electrical parameters and are thus preferably connected to the same electric power source. As in FIG. 1 and FIG. 3, the inductor 3 has an increasing distance from the inner surface of the spectacle-shaped bore 2 as it approaches the two narrowed regions 4a, 4b.

Figure 5:
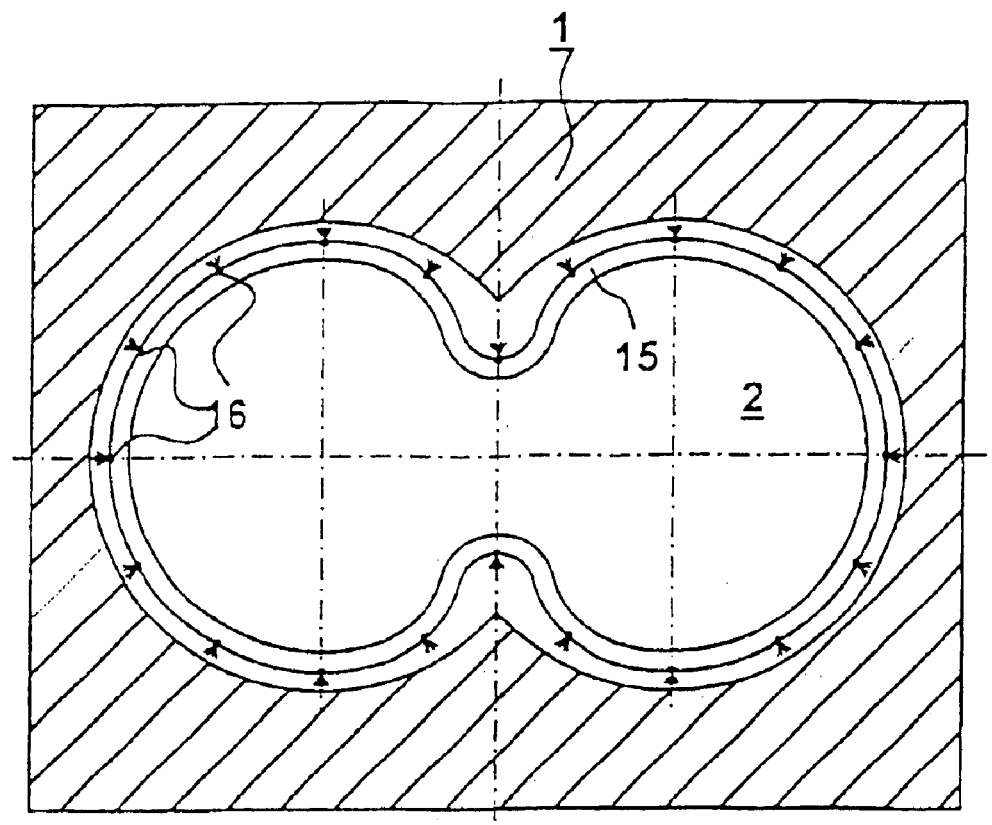
FIG. 5 shows a cooling device in the barrel.

FIG. 5 shows a cooling device 15 inside the spectacle-shaped bore 2 of a barrel 1. It is located a certain axial distance behind the inductor, which is not shown here, and, together with the inductor, is passed through the spectacle-shaped bore 2 in the axial direction. This cooling device 15 is designed in the form of a circulating distributor pipe, which is bent essentially in the form of a "figure 8" and to this extent is adapted to the contour of the spectacle-shaped bore 2. The distributor pipe is provided with a coolant feed line, which is not shown in the drawing, and with numerous nozzles 16 along its periphery, which are directed radially outward and discharge a gaseous or liquid coolant. The nozzles 16 are directed obliquely toward the rear opposite the direction of movement of the inductor during the hardening operation, so that the regions of the inner surface still to be heated are not cooled, but rather only the surface regions that have already been brought to the hardening temperature are cooled.

The present invention makes it possible to provide the barrels of twin-screw extruders with a hardened layer of more or less constant thickness in the region of the inner surface much less expensively than was previously the case, since an expensive heat treatment of the whole barrel in a furnace can be forgone. The process achieves not only significant energy savings, but also a drastic reduction of the treatment time. The essential feature is that undesirable through-hardening of the narrowed regions is prevented with the process of the invention and by the use of an inductor of the invention.

What is claimed is:

1. A process for producing a barrel for a twin-screw extruder with intermeshing screws from a steel block, wherein the barrel has a wear resistant inner surface, the process comprising the steps of:

producing two partially intersecting bores passing completely through the steel block, the two intersecting bores forming a spectacle-shaped bore having narrowed regions where the two intersecting bores intersect; and hardening an inner surface of the spectacle-shaped bore with essentially constant depth of penetration by passing an inductor comprising an electrical conductor through the spectacle-shaped bore from one end to the other, the electrical conductor being smaller than but having approximately the same shape as the inner contour of the spectacle-shape bore and being configured such that less energy for heating the inner surface of the spectacle-shaped bore is delivered in the vicinity of the narrowed regions of the spectacle-shaped bore by the longitudinal sections on the periphery of the electrical conductor than in regions on the inner contour remote from the narrowed regions.

2. The process of claim 1, further comprising the step of passing a cooling device through the spectacle-shaped bore at a distance behind the electrical conductor for accelerated cooling of the inductively heated regions.

3. The process of claim 2, wherein the cooling device uses one of liquid and gaseous coolant.

4. The process of claim 1, wherein said step of hardening comprises passing the inductor through the spectacle-shaped bore such that the inductor is at a greater distance from the inner surface in the vicinity of the narrowed regions than the remaining regions.

5. The process of claim 1, wherein the electrical conductor comprises a plurality of segments and said step of hardening the inner surface of the spectacle-shaped bore with essentially constant depth of penetration comprises independently electrically controlling each of said plural segments such that less energy for heating the inner surface of the spectacle-shaped bore is delivered by the longitudinal sections on the periphery of the electrical conductor in the vicinity of the two narrowed regions of the spectacle-shaped bore than in regions on the inner contour remote from the narrowed regions.

6. The process of claim 1, further comprising the step of covering the inner surface of the spectacle-shaped bore with a hardenable plating material before the last machining operation of the steel block.

7. An apparatus for the inductive hardening of an inner surface of a spectacle-shaped bore in a steel barrel for a twin extruder with essentially constant depth of penetration by passing the apparatus from one end of the spectacle-shaped bore to the other, the spectacle shaped bore being formed from two partially intersecting bores which extend completely through the steel barrel and having narrowed regions where the two intersecting bores intersect, the apparatus comprising an inductor including an electrical conductor having an outer contour that is smaller than but has approximately the same shape as the inner contour of the spectacle-shaped bore and is configured such that less energy for heating the inner surface of the spectacle-shaped bore is delivered by the longitudinal sections on the periphery of the electrical conductor in the vicinity of the narrowed regions of the spectacle-shaped bore than in regions on the inner contour remote from the narrowed regions.

8. The apparatus of claim 7, wherein the inductor comprises a continuous electrical conductor that is bent to form a figure-eight shaped outer contour, the figure-eight shaped outer contour having upper and lower regions, a middle region, and two reduced radius regions between the upper and lower regions and the middle regions, respectively, the upper and lower regions being bent into a circular shape, the reduced radius regions having a decreased radius, and the middle region being an oppositely curved region joining the reduced radius regions, wherein a coolant is circulatable through said continuous electrical conductor tube.

9. The apparatus of claim 7, wherein said inductor comprises a plurality of segments that are each independently electrically controllable.

10. The apparatus of claim 9, wherein said plural segments form a figure-eight shaped outer contour, the figure-eight shaped outer contour having upper and lower segments, middle segments, and reduced radius segments between each end of the upper and lower regions and the middle regions, respectively, the upper and lower regions being bent into a circular shape, the reduced radius regions having a decreased radius, and the middle region being an oppositely curved region between the reduced radius regions.

11. The apparatus of claim 7, further comprising a cooling device arrangeable a distance behind said inductor for cooling the surface regions of the spectacle-shaped bore that are heated by said inductor.

12. The apparatus of claim 11, wherein said cooling device comprises a circulating distributor pipe bent into a figure-eight shape similar to the outer contour of said inductor and adapted to the spectacle shaped bore, said distributor pipe having a plurality of nozzles for allowing a coolant to pass therethrough directed radially outward and obliquely opposite to an intended passing direction of said apparatus through the spectacle-shaped bore.

13. The apparatus of claim 8, wherein said electrical conductor comprises a copper tube.

14. The apparatus of claim 12, wherein said coolant comprises a coolant gas.

\* \* \* \* \*